Patented Aug. 26, 1947

2,426,397

UNITED STATES PATENT OFFICE 2,426,397

PROCESS FOR PREPARING UNSUBSTITUTED MERCAPTOTHIAZOLE

Paul C. Jones, Chagrin Falls, Ohio, assignor to The B. F. Goodrich Company, New York, N. Y., a corporation of New York No Drawing. Application October 14, 1944, Serial No. 558,736

6 Claims. (Cl. 260—302)

This invention relates to the process for the manufacture of unsubstituted 2-mercaptothiazole, a new composition of matter.

The object of this invention is to provide a method for the manufacture of unsubstituted 2-mercaptothiazole, a new composition of matter, which has not been prepared and described in spite of the fact that the use of unsubstituted 2-mercaptothiazole is claimed by Sebrell in U. S. Patent 1,591,441.

According to my invention, a mono-halogenated acetaldehyde is reacted with ammonium or alkali metal salts of unsubstituted dithiocarbamic acid. Unsubstituted 2-mercaptothiazole can be synthesized by the following methods: A mono-halogenated acetaldehyde is reacted in an inert diluent such as water with salt, e. g., the ammonium salt, of unsubstituted dithiocarbamic acid to yield a solid suspended intermediate product in which the

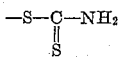

group is bound to the same carbon atom to which the aldehyde group is attached. This reaction product, however, changes spontaneously on standing to unsubstituted 2-mercaptothiazole by splitting out water and closing the thiazole ring to yield the mercaptothiazole in crystalline form. The overall reaction may be represented in the following manner:

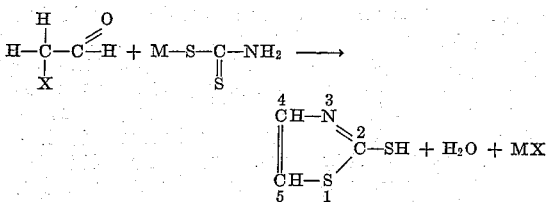

where M is ammonium or an alkali metal and X is halogen.

It is well known that paraldehyde, the cyclic trimer of acetaldehyde, is the equivalent of acetaldehyde in most of its reactions. In this reaction, likewise, trihalogenated paraldehyde, the cyclic trimer of mono-halogenated acetaldehyde, may be used instead of its monomer. Thus trihalogenated paraldehyde may be reacted with a salt of unsubstituted dithiocarbamic acid in the same manner and with the same results as when mono-halogenated acetaldehyde is used. In this case the overall reaction may be represented in the following manner:

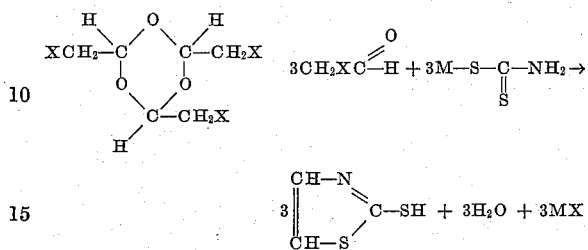

where M is ammonium or alkali metal and X is halogen.

Monochloracetaldehyde hydrate is the preferred form of this aldehyde, for the anhydrous form varies in composition because of its tendency to take up water from the atmosphere and form the hydrate. Either of these variants reacts in the same manner. These variants of the mono-halogenated acetaldehydes, namely the paraldehyde form and the hydrate, are hereinafter referred to as "bodies engendering mono-halogenated acetaldehyde."

While ammonium dithiocarbamate is generally preferred as the reactant for use with chloracetaldehyde, because of its availability, alkali metal salts of dithiocarbamic acid such as the sodium and potassium salts are equally as satisfactory. Sodium dithiocarbamate is preferred for the reaction with the tribromo paraldehyde from an operational standpoint, but the other dithiocarbamates will react in the same way.

Unsubstituted 2-mercaptothiazole is somewhat soluble in water while the intermediate product is insoluble. Hence separation of the by-product halide salt can conveniently be made by removal in water solution before conversion of the intermediate to the final product.

A variety of organic solvents may be used as reaction diluents. Since the intermediate product is insoluble in most of the organic solvents which are commonly used as diluents for organic reactions, the recovery of the intermediate product from the solvent is not necessary.

When the reaction is carried out in inert organic solvents which are commonly used as diluents for organic reactions, the by-product halide salt and the intermediate product may be filtered off together. The by-product salt can then be removed from the mixture by adding the filter cake to a volume of water. About 2 to 3 times the weight of the cake is a convenient volume for solution and removal of the by-product halide. The intermediate product is then recovered by vacuum filtration which dries the intermediate product sufficiently so that further drying is not necessary. The conversion of the intermediate product to the mercaptothiazole is not rapid enough to cause a finite loss during this purification step.

The process requires no special equipment and can be carried out in readily available standard equipment.

The reaction is preferably carried out in a reactor provided with an agitator and a device for regulating the temperature such as a jacket for circulating a heating or cooling medium.

In accordance with the preferred procedure, one molecular portion of the mono-halogenated acetaldehyde in either its monomeric or trimeric form is dissolved in water or in an inert organic solvent, a quantity of water about equal to the weight of the mono-halogenated acetaldehyde being suitable. To this solution a solution or suspension in the same medium of ammonium dithiocarbamate in a concentration of 40% by weight containing a 10% excess over one molecular portion is added slowly with stirring. If desired the order of addition may be reversed. Because of the exothermic nature of the reaction to form the solid suspended intermediate product and ammonium halide, it is often desirable to remove heat during the reaction.

The following examples describe the process more specifically, but, it will be understood, the invention is not limited to these details. Wide variations both in the process and amounts of reactants are possible without materially effecting the results.

Example I 48.26 grams of chloracetaldehyde hydrate are dissolved in 56 grams of water. To this solution 150 grams of a 40% aqueous solution of ammonium dithiocarbamate (equivalent to 10% excess over an equimolar portion) are slowly added, with stirring, over a period of half an hour. The exothermic reaction that takes place is cooled by means of an ice bath and kept at 22° C. An oily layer forms which contains the reaction product. The reaction mixture is then acidified with sulfuric acid and the heavy white precipitate which forms, is filtered off. This precipitate, an intermediate product in the formation of the mercaptothiazole, was found to have a melting point of 96 to 98° C. and was insoluble in water and most of the common organic solvents.

The solid intermediate product gradually transforms into an oily substance from which appears the crystalline unsubstituted 2-mercaptothiazole. This change takes place spontaneously on standing for a few weeks, but may be accelerated by heating if desired.

The crystalline mercaptothiazole was of a light buff color and soluble in water, ether and acetone. A portion of the mercaptothiazole was recrystallized from ether and was found to have a melting point of 75.5–77° C. A quantitative analyses of the recrystallized product gave the following results:

|   | Per cent calculated (as $C_3H_3NS_2$) | Per cent found |
|---|---|---|
| C | 30.75 | 30.82 |
| H | 2.58 | 2.64 |
| N | 11.95 | 11.88 |
| S | 54.72 | 54.58 |
|   | 100.00 | 99.92 |

Example II 85 grams of ammonium dithiocarbamate are dissolved in 200 ml. of water, 39.5 ml. of 50% NaOH solution are then added which reacts with the ammonium salt to liberate gaseous ammonia and form sodium dithiocarbamate. The solution turns green. To this solution, 92 grams of tribromoparaldehyde are added slowly with stirring. The exothermic reaction that takes place causes the temperature of the reaction mixture to rise to 84° C. The solution turns yellow, then brown and a grey coherent mass is formed.

After the reaction mixture is allowed to stand over night, the pH of the mother liquor is about 6. A dark resinous material is on the bottom of the flask. This resinous material is partially soluble in a caustic alkali solution but practically insoluble in water and the usual organic solvents which indicate the resinous material to be a mixture of unsubstituted 2-mercaptothiazole and the intermediate product. Further conversion of the intermediate product in this resinous material to unsubstituted 2-mercaptothiazole takes place on standing or on further heating.

From the data herein presented, the fact will be readily apparent that this invention constitutes a process for the manufacture of the unsubstituted 2-mercaptothiazole, a new composition of matter. Yields of high purity, crystalline unsubstituted 2-mercaptothiazole are obtainable, the purity of the crude product being such that for commercial use further purification is not necessary.

It will of course be understood that other solvents and reagents of the kind described above may be employed to assist in carrying out the reaction and to purify the products obtained. Furthermore, the relative proportions of the ingredients, as well as the time and temperature of the reaction may be varied if desired.

What I claim is:

1. A process for the manufacture of unsubstituted 2-mercapto-thiazole which comprises reacting in solution in water a substance selected from the group consisting of ammonium and alkali metal dithiocarbamates with a substance selected from the group consisting of mono-halogenated acetaldehyde, tri-halogenated paraldehyde and mono-halogenated acetaldehyde hydrate, and removing by filtration the solid suspended intermediate product which converts spontaneously to the unsubstituted 2-mercaptothiazole.

2. A process for the manufacture of unsubstituted 2-mercaptothiazole which comprises reacting in solution in water substantially equimolecular portions of ammonium dithiocarbamate with mono-halogenated acetaldehyde, precipitating the reaction product by acidification of the reaction mixture and removing by filtration the solid suspended intermediate product which converts spontaneously to the unsubstituted 2-mercaptothiazole.

3. A process for the manufacture of unsubstituted 2-mercaptothiazole which comprises reacting in solution in water substantially one molecular portion of a substance selected from the group consisting of ammonium and alkali metal dithiocarbamates with an equivalent of a substance selected from the group consisting of mono-halogenated acetaldehyde, tri-halogenated paraldehyde and mono-halogenated acetaldehyde hydrate and removing by filtration the solid suspended intermediate product which converts spontaneously to the unsubstituted 2-mercaptothiazole.

4. A process for the manufacture of unsubstituted 2-mercaptothiazole which comprises reacting in solution in water substantially one molecular portion of sodium dithiocarbamate with one-third molecular portion of tri-bromoparaldehyde, and removing the solid suspended intermediate product which converts spontaneously to the unsubstituted 2-mercaptothiazole.

5. A process for the manufacture of unsubstituted 2-mercaptothiazole which comprises reacting in solution in water substantially equimolecular portions of ammonium dithiocarbamate and mono-chloracetaldehyde hydrate, precipitating the reaction product by acidification of the reaction mixture, and removing by filtration the solid suspended intermediate product which converts spontaneously to the unsubstituted mercaptothiazole.

6. A process for the manufacture of unsubstituted 2-mercaptothiazole which comprises reacting in solution in water substantially equimolecular portions of ammonium dithiocarbamate and mono-chloracetaldehyde hydrate, separating the solid intermediate product from the reaction mixture by decantation and heating the intermediate product to convert it to unsubstituted 2-mercaptothiazole.

PAUL C. JONES.

REFERENCES CITED

The following references are of record in the file of this patent:

UNITED STATES PATENTS

| Number | Name | Date |
| --- | --- | --- |
| 1,591,441 | Sebrell | July 6, 1926 |
| 2,186,419 | Mathes | Jan. 9, 1940 |
| 2,353,593 | Scott | July 11, 1944 |

Certificate of Correction

August 26, 1947.

Patent No. 2,426,397.

PAUL C. JONES

It is hereby certified that error appears in the printed specification of the above numbered patent requiring correction as follows: Column 2, line 9, for that portion of the equation reading "3CH$_2$XC" read —→3CH$_2$XC; and that the said Letters Patent should be read with this correction therein that the same may conform to the record of the case in the Patent Office.

Signed and sealed this 2nd day of March, A. D. 1948.

[SEAL]

THOMAS F. MURPHY,
*Assistant Commissioner of Patents.*